(12) United States Patent
Sukman

(10) Patent No.: US 7,984,047 B2
(45) Date of Patent: Jul. 19, 2011

(54) SYSTEM FOR EXTRACTING RELEVANT DATA FROM AN INTELLECTUAL PROPERTY DATABASE

(76) Inventor: Jesse David Sukman, Arlington, VA (US)

( * ) Notice: Subject to any disclaimer, the term of this patent is extended or adjusted under 35 U.S.C. 154(b) by 428 days.

(21) Appl. No.: 11/401,903

(22) Filed: Apr. 12, 2006

(65) Prior Publication Data

US 2006/0248120 A1 Nov. 2, 2006

Related U.S. Application Data

(60) Provisional application No. 60/670,735, filed on Apr. 12, 2005.

(51) Int. Cl.
*G06F 17/30* (2006.01)
(52) U.S. Cl. . 707/727; 707/754; 707/769; 707/999.003; 707/E17.069; 707/E17.109
(58) Field of Classification Search .......... None
See application file for complete search history.

(56) References Cited

U.S. PATENT DOCUMENTS

| 5,754,840 | A | 5/1998 | Rivette et al. |
|---|---|---|---|
| 5,991,751 | A | 11/1999 | Rivette et al. |
| 6,014,663 | A | 1/2000 | Rivette et al. |
| 6,038,561 | A | 3/2000 | Snyder et al. |
| 6,263,335 | B1 | 7/2001 | Paik et al. |
| 6,339,767 | B1 | 1/2002 | Rivette et al. |
| 6,499,026 | B1 | 12/2002 | Rivette et al. |
| 7,117,198 | B1 | 10/2006 | Cronin et al. |
| 2002/0042784 | A1 | 4/2002 | Kerven et al. |
| 2002/0138297 | A1* | 9/2002 | Lee ................................ 705/1 |
| 2002/0174131 | A1 | 11/2002 | Winer et al. |
| 2003/0033295 | A1* | 2/2003 | Adler et al. ....................... 707/3 |
| 2004/0006457 | A1 | 1/2004 | Dehlinger et al. |
| 2004/0006459 | A1 | 1/2004 | Dehlinger et al. |
| 2004/0006558 | A1 | 1/2004 | Dehlinger et al. |
| 2004/0088332 | A1* | 5/2004 | Lee et al. ...................... 707/200 |
| 2004/0103112 | A1 | 5/2004 | Colson et al. |
| 2004/0133555 | A1* | 7/2004 | Toong et al. ....................... 707/2 |
| 2005/0038770 | A1* | 2/2005 | Kuchinsky et al. ............... 707/1 |
| 2005/0120011 | A1 | 6/2005 | Dehlinger et al. |
| 2005/0144177 | A1* | 6/2005 | Hodes ........................... 707/100 |
| 2005/0198026 | A1 | 9/2005 | Dehlinger et al. |
| 2005/0210009 | A1* | 9/2005 | Tran ................................ 707/3 |
| 2005/0216828 | A1 | 9/2005 | Brindisi |
| 2005/0234738 | A1 | 10/2005 | Hodes |
| 2006/0026174 | A1 | 2/2006 | Lundberg et al. |
| 2006/0036451 | A1 | 2/2006 | Lundberg et al. |
| 2006/0117252 | A1* | 6/2006 | Du et al. ....................... 715/514 |
| 2006/0195433 | A1 | 8/2006 | Kim |

* cited by examiner

*Primary Examiner* — Don Wong
*Assistant Examiner* — Andalib F Lodhi

(57) ABSTRACT

A method of extracting publications relevant to a reference entity, comprising the steps of generating an initial set of publications; associating the initial set with a database to generate a user-engageable display of at least one element relating to the at least one publication such that the at least one element is a required characteristic of the at least one publication in accordance with a predetermined standard of analysis; selecting at least a first element from the at least one element that represents a characteristic not present in the reference entity; yielding a result including publications in the initial set and excluding publications relating to the selected at least a first element in accordance with the predetermined standard of analysis.

7 Claims, 13 Drawing Sheets

SYSTEM FOR EXTRACTING RELEVANT DATA FROM AN INTELLECTUAL PROPERTY DATABASE

CROSS-REFERENCE TO RELATED APPLICATION

The present application claims priority from U.S. Provisional Patent Application No. 60/670,735, filed Apr. 12, 2005, the entirety of the disclosure of which is hereby incorporated by reference into the present application.

BACKGROUND

This invention pertains to the field of database searching, and more particularly, searching an intellectual property database.

It is commonly desired by those within the legal practice, including law firms, practitioners, patent attorneys and agents, search firms, technology transfer managers, corporations, corporate Intellectual Property (IP) departments and the like, to extract relevant publications from an intellectual property database (e.g. information stored locally on CD-ROM, stored on network storage devices through a local area network, or stored on remote database systems through one or more disparate network paths, e.g. the Internet) with a predetermined expectation of accuracy. Relevant publications as used herein refer to publications that fall within the scope of having pertinence to a searcher, in accordance with a predetermined standard of analysis.

Accuracy, herein, is defined as the ratio of relevant publications actually retrieved (by a search system) to the total number of relevant publications within an initial set of publications. A search may be performed to determine one's right to use a product or right to produce a product, where the product may include an apparatus, composition, method, system, or a service (referred to as a reference entity, herein). As used herein, the term "infringement search" is meant to include any or all of a variety of terms used in the art to refer to database searching, including but not limited to "right to use search," "right to produce search," "clearance search," "infringement search," "freedom to operate," etc. Efficiency and accuracy may be of essence.

Methods of extracting IP data from databases are known that utilize keywords, annotations and publication summaries in retrieving publications. Algorithms that evaluate term frequency or assign specific weight to specific terms for effectually returning publications of greater relevance are also known. Also, methods are known that comprise the step of rephrasing portions of patent publications, such as the "Title," "Abstract" or "Claims," to conform to standard industry lexicography. Finally, search methods are known that match a set of "synonyms" to a specific search query to ensure that publications are not ignored solely due to differences in semantics.

While such methods are useful, improved results may be realized by search methods that take into account the inherent nature of infringement searches, as contemplated by the present invention. In conducting an infringement search for a reference entity, it is difficult for the searcher to conceptualize the range of relevant publications, due to the depth and complexity of the legal bounds of patent publications. Further, since an infringement search is generally conducted in consideration of a physically-existing object, the scope and variation of characteristics susceptible to infringement may be large. Although known methods may be helpful in preventing the searcher from missing relevant publications in certain instances, such methods only marginally increase the speed and efficiency of an infringement search. Efficiency, as used herein, is defined as the ratio of relevant publications retrieved to the total number of publications retrieved by a search system.

SUMMARY OF THE INVENTION

The present invention overcomes the foregoing disadvantages by providing an improved system of extracting relevant intellectual property data. In an exemplary embodiment, a system is described in which annotations, keywords, phrases, and/or symbols (collectively referred to as annotations, herein) represent elements or conditions taught, recited or implied in patent publications; each represented element or condition is deemed a necessary or essential characteristic, in accordance with a predetermined standard of analysis, for an object to infringe or to have relevance. A primary user stores the annotations in an annotation database and the annotations are arranged in hierarchal form with respect to scope and variation.

A client, or end user, then conducts an infringement search of a reference entity by inputting an initial set of publications, then creating a search criterion by selecting annotations relating to elements not present in the reference entity. A search criterion, as used herein, refers to a set a parameters for retrieving search results. Final search results are then retrieved. The final search results comprise publications of the initial set that do not correlate to annotations selected by the client. Thus, relevant intellectual property data may be obtained through the elimination, or filtering, of at least a set of annotated publications from a larger set of publications.

DETAILED DESCRIPTION

Preferred embodiments and applications of the invention will now be described. Other embodiments may be realized and structural or logical changes may be made to the disclosed embodiments without departing from the spirit or scope of the invention. Although the preferred embodiments disclosed herein have been particularly described as a system for extracting relevant intellectual property data in the form of patents and patent publications, it should be readily apparent that the invention may be embodied to implement any system in which similar problems may occur. For illustrative purposes, the discussion herein may refer to U.S. patent publications. Those skilled in the art will appreciate the application of the invention to other jurisdictions (e.g. Europe, Canada or Japan), either alone or in combination, and to other forms of information (e.g. trademarks, company structure, prosecution and litigation history, technical publications or general publications). It may also be appreciated that the current invention may be combined with other systems and methods known in the art of electronic searching and IP management.

I. Overview

Figure 1:
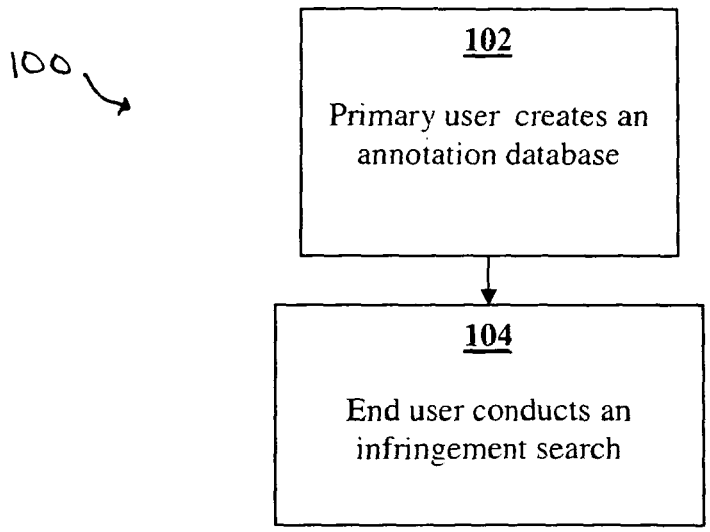
FIG. 1 is a functional block diagram of an embodiment of the current invention.

As in FIG. 1, a first non-limiting embodiment of the current invention 100 is illustratively depicted as a system comprising a first process 102 and second process 104. The first process 102 comprises a process of creating an annotation database. The second process 104 comprises a process of conducting an infringement search. The first process 102 is described as being performed by a primary user. The second process 104 is described as being performed by an end user or client. While the invention is herein described as two processes, one skilled in the art will appreciate that it is within the scope of the invention, and it may be preferred in certain instances, for both the first and second process to be performed simultaneously, and/or by a single user and/or at a single location.

A. Creating an Annotation Database

Figure 1A:
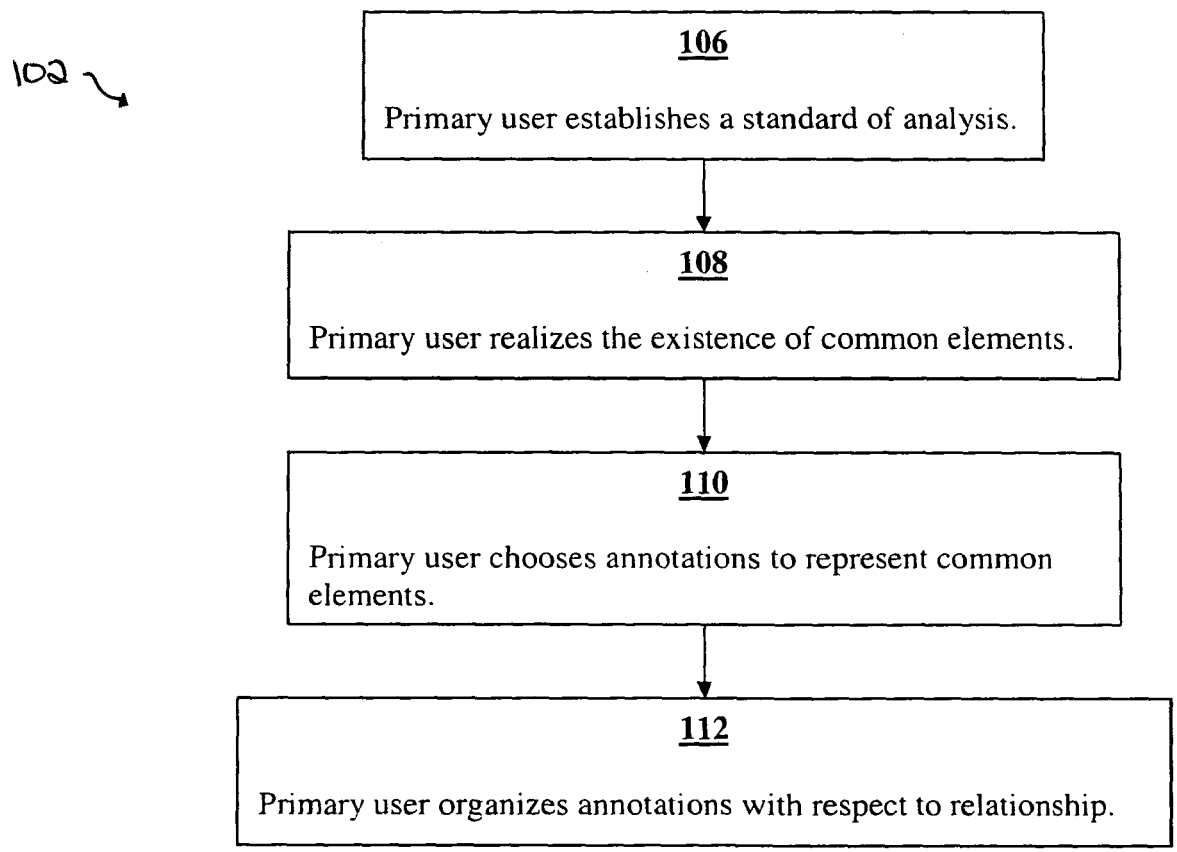
FIG. 1(a) is a functional block diagram illustrating a process of an embodiment of the current invention.

The process of annotating a set of publications 102 will now be discussed in accordance with the first embodiment of the current invention, as in FIG. 1(a). The annotation process comprises the steps of establishing a standard of analysis 106; realizing the existence of common elements 108; choosing annotations to represent common elements 110; and organizing annotations with respect to relationship 112.

1. Establishing a Standard of Analysis

The first step of the annotation process 102 is the establishment of a standard of analysis 106 for determining infringement or, alternatively, relevance. In the case of patent publications, the standard of analysis may relate to a determination of which supporting information to consider and to what extent. For example, in developing a standard of analysis specifically tailored to a highly visual patent art, it may be deemed sufficient to detect infringement or relevance solely in view of the "Drawings" portion. For more complex patent arts, infringement may rely substantially on the "Claims" portion or a combination of portions. At a level of criticality, the standard of analysis may warrant consideration of any information potentially pertinent to the interpretation of the patent publications, both intrinsic and extrinsic, including prosecution history, related art and technical publications. The standard of analysis may further include legal considerations, level of expertise, degree of conservativeness, nature of the art, level of regard for intellectual property within the industry and additional business factors including risk analysis. Finally, the standard of analysis may take into account the transient nature of any particular consideration.

In an exemplary embodiment, the standard of analysis relates specifically to patent infringement. In the case of patent infringement, it is desirable that detection of elements be based on at least the "Claims" portion of patent publications. In accordance with current practice, patent publications may comprise at least one claim and each claim may be considered "independent" or "dependent" (including "multiple dependent claims"). Each "claim" of a patent may be considered to consist of a set of limitations, each limitation contributing to the formation of a boundary as to the scope of the claimed invention. "Design" patent publications may be considered, in essence, to consist of a single claim comprising limitations depicted visually through "Drawings."

2. Realizing the Existence of Common Elements

Figure 1B:
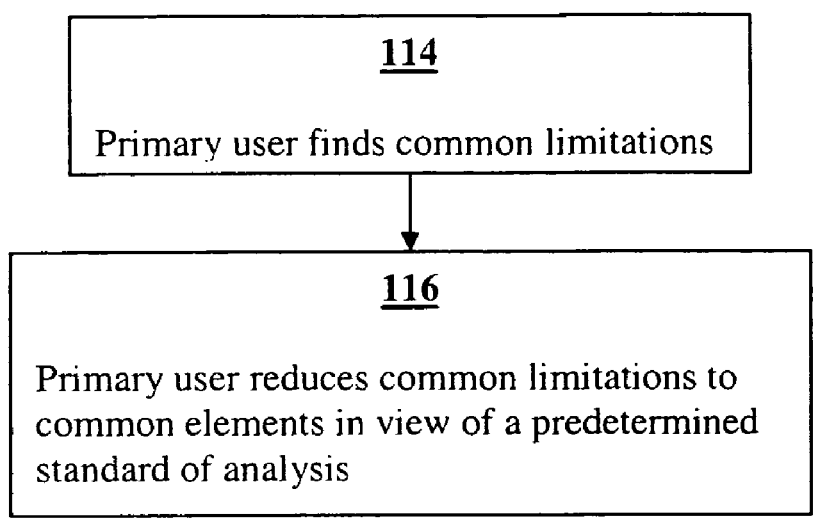
FIG. 1(b) is a functional block diagram illustrating a process of an embodiment of the current invention.

As in FIG. 1(b), the primary user, in consideration of the predetermined standard of analysis, analyzes patent publications for the purpose of detecting common elements 108. A common element, in some embodiments, refers to an element or concept that is implicitly or explicitly recited in a patent publication that is deemed a necessary condition for infringement of that patent publication in accordance with a predetermined standard of analysis.

Where, for example, the predetermined standard of analysis is patent infringement under U.S. law, a common element is an element or concept that must be present in an accused infringing object (e.g. a product, method, apparatus, etc., that is being analyzed for infringement) in order for that object to infringe the patent publication.

In other words, a common element of a patent publication is a sine qua non for infringement of the patent publication, in accordance with a predetermined standard of analysis. Likewise, an object that comprises a common element (of a patent publication) may, but does not necessarily, infringe the patent publication.

In some embodiments, where the predetermined standard of analysis is related to "relevance," then a common element of a publication is an element or concept necessary for a reference entity to comprise for the reference entity to have relevance to the publication. Thus, a primary user would analyze a patent publication and detect those elements or concepts that are deemed essential or necessary conditions.

In an exemplary embodiment, the detection of common elements may involve, first, finding implicit or explicit limitations that are common to each "claim" (or at least each "independent claim") of a patent publication 114, such a limitation herein referred to as a common limitation. The predetermined standard of analysis is then implemented to reduce a common limitation of a patent publication to a common element of the patent publication 116. Thus, the predetermined standard of analysis operates to modify the scope of a common limitation, defined by the language of the inventor, to realize a common element.

For example, a patent publication may comprise a set of claims, each claim reciting the limitation of "a composition comprising the element argon." Thus, "comprising the element argon" is a common limitation. However, in applying a predetermined standard of analysis, in view of, for example, legal considerations and conservativeness, the common limitation of "comprising argon" may be too narrow to function as a common element. Thus, in creating a common element, the common limitation, "comprising argon" may be broadened to the concept of "comprising an inert gas."

3. Choosing Annotations to Represent Common Elements

The primary user then chooses annotations to represent common elements 110. An annotation may be further supported by an assigned definition. It is preferred that both the annotation and the assigned definition comprise broadly-accepted terminology, irrespective of the lexicography of any specific patent publication. Due to the eliminatory nature of the preferred embodiment of the current invention, there is no inherent requirement to apply annotations where application would be futile, difficult or impossible.

a. Discretionary Nature of Annotation Application

Any individual publication may be assigned no annotations, one annotation, or several annotations. The degree to which a publication is annotated may not necessarily affect the accuracy of the system. In other words, the system may be considered eliminatory. Thus, the absence of annotation of a publication results in the retrieval of the publication in final search results rather than the elimination of the publication from the final search results. Thus, in a preferred embodiment, the extent to which publications are annotated relates neither to the complexity nor the extent of novelty of the publication, and is within the discretion of the primary user. The discretion of the primary user may rely heavily on both the predetermined standard of analysis and the availability of broadly-accepted terminology in a specific art to represent a common element.

b. The Use of Logic Operators

In the course of the annotation process, it may be the case that specific publications seem not to comprise common elements or at least not to an extent to which annotations may easily be assigned. For example, in simplified terms, a publication comprises a set of twenty claims. The first ten claims each recite at least a first limitation, A. The remaining ten claims each recite at least a second limitation, B, and do not recite limitation A. In response, a primary user may attempt to realize a common element so broad in scope as to encompass both A and B. However, such an attempt may be ineffectual, since the resulting common element may be substantially broader than the scope of any particular claim. Alternatively, the primary user may employ the use of logic operators. Assume an appropriate annotation representing A is A' and an appropriate annotation for B is B'. In using logic operators, a common element in this case may be represented by "A' AND B'." In other words, while neither A', alone, nor B', alone, represent a common element of the publication, a reference entity (i.e., the object in question of infringement) cannot infringe the publication if the reference entity comprises "both A' and B'." Further, logic operators may be employed in more complex cases. For example, a publication comprises a set of twenty claims. The first ten claims recite at least limitations C and D. The final ten claims recite at least limitation. E, but recite neither C nor D. In this case, it may be most effective to represent the common element as "(C' OR D') AND E'," where C', D' and E' represent annotations of limitations C, D and E, respectively.

4. Organizing Annotations With Respect to Relationship

Next, a hierarchy (or network or listing of annotations) may be created for organizing annotations with respect to scope or likeness or a combination thereof 112. It is preferable that annotations are arranged at least with respect to scope. A first annotation may be embedded within a second annotation, where the first annotation relates to a common element that is a species of the common element of the second annotation. It is also preferred that redundancy is minimized. In some embodiments, the primary user may utilize placeholder annotations. Placeholder annotations, herein, refer to annotations that do not correlate to common elements of any publication, but merely aid in forming the structure of the hierarchy, thereby increasing functionality.

The assigned annotations and related publication identifications (e.g. serial numbers, publication numbers, patent numbers or the like) are stored as the annotation record. The annotation record may be stored as data, preferably in a user-side database or storage module, herein referred to as the annotation/publication database 113.

B. Conducting the Infringement Search

Figure 2:
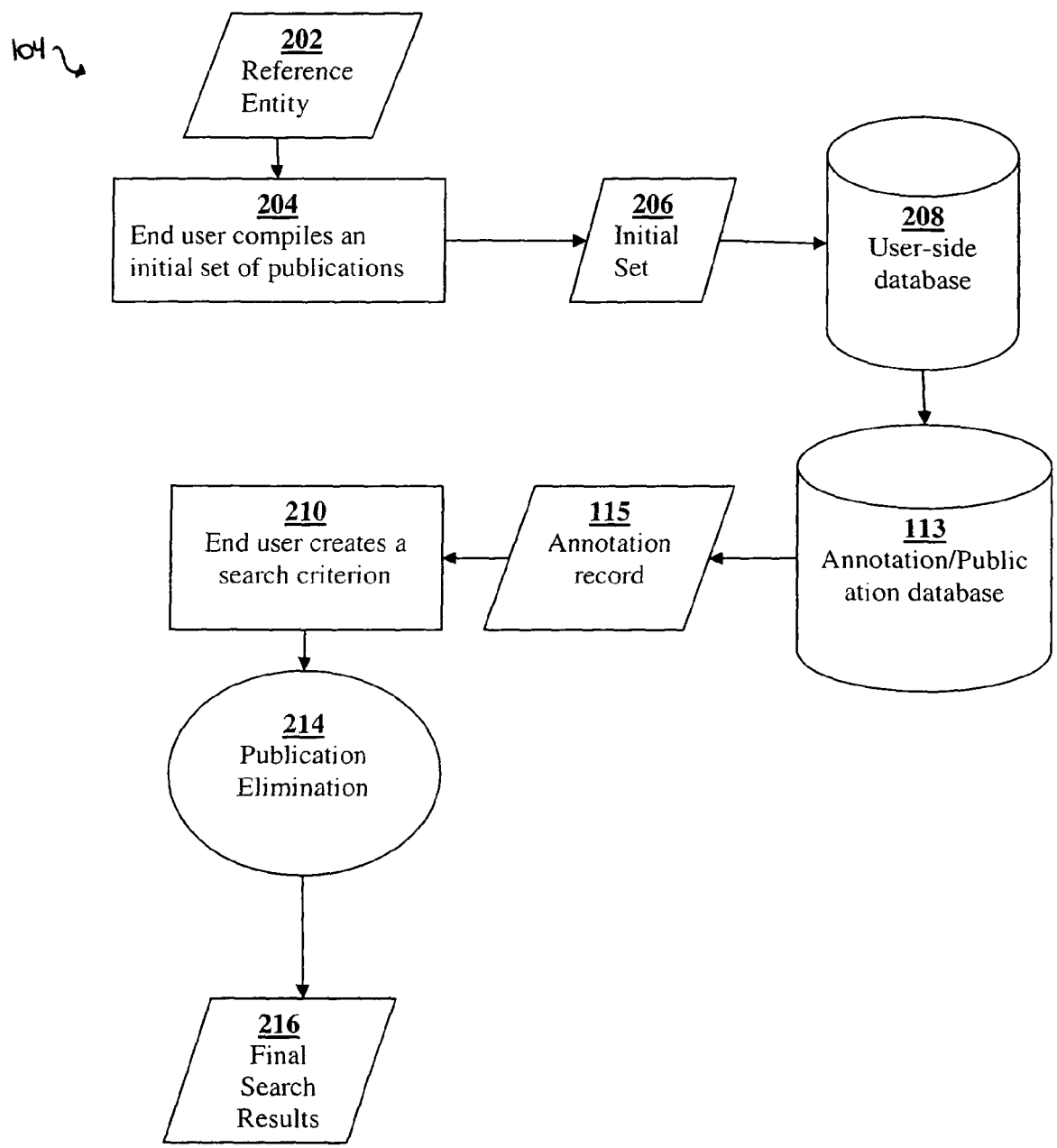
FIG. 2 is a schematic diagram of an embodiment of the current invention.

FIG. 2 illustrates the second process 104 of the first non-limiting embodiment of the current invention. The second process 104 may be considered to be the actual performance of the infringement search. The search is performed by an end user in view of a reference entity 202 or known characteristic of a reference entity 202. The process of conducting a clearance or infringement search generally comprises the steps of compiling an initial set of publications 204 and creating a search criterion 210.

1. Compiling an Initial Set

An initial set of publications 206 may be realized as input data and stored. In some embodiments, input data may be stored in a user-side database 208. The initial set of publications 206 may comprise a prior compilation of publications from a known source. For example, the initial set may comprise patent publications of designated classes or sub-classes in accordance with the U.S. Patent and Trademark Office (USPTO) classification system, data field searches, natural language searches, Boolean searches, searches conducted with known patent searching software, prior final search results of the current invention or any combination thereof. In some embodiments, the initial set includes a set of publications encompassing the entire scope of publications that may conceivably lead to issues of infringement or relevance in regards to a reference entity, limited by the discretion of the client or end user and reasonability. The initial set may comprise publications not correlated with annotation of the annotation database described herein.

2. Creating a Search Criterion

An end user then refers to the annotation record 115 represented in hierarchy form. The end user creates a search criterion 210 by selecting annotations (relating to common elements) of the annotation record 115 that are not present in relation to the reference entity 202 undergoing clearance. The search criterion 210 may be saved or stored in the user-side database 208. At the completion of the creation of the search criterion, an automated function eliminates publications, from the initial set 214, that relate to selected annotations of the search criterion. The remaining publications of the initial set 214 are returned as final search results 216.

In some embodiments, final search results includes information such as additional characteristics of publications of the initial set either explicit or implicit. Such information includes any information known for assisting the end user 301 in accordance with a predetermined standard of analysis. In some embodiment, such information includes excluded publications or excluded annotations distinguished from the retrieved publications or unselected annotations. In some embodiments, final search results comprises an opinion or report, derived from the set of returned publications of the initial set.

II. Exemplary implementation

Figure 3:
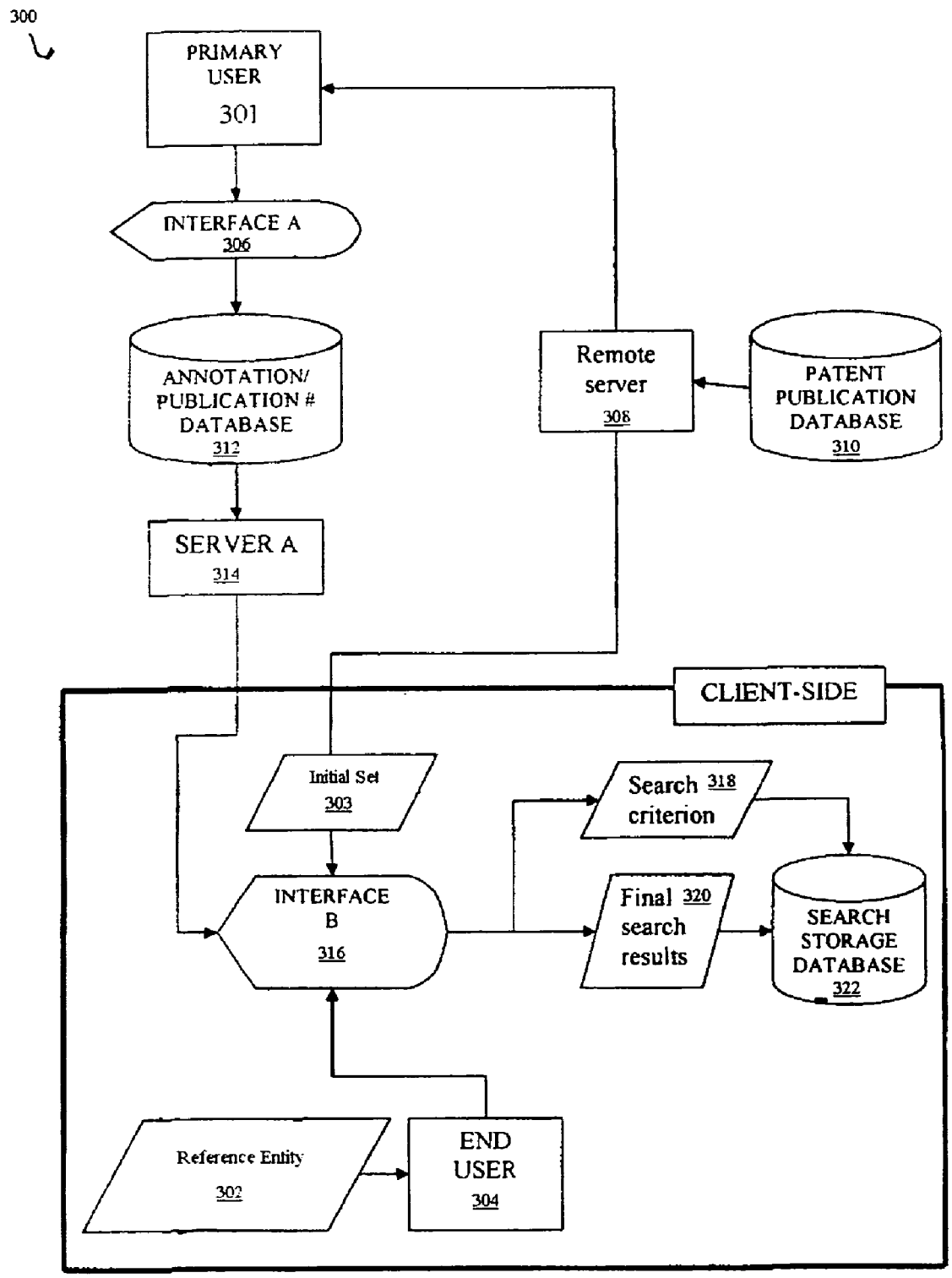
FIG. 3 is a schematic flow diagram of an embodiment of the current invention.

The following illustrates an exemplary implementation of a preferred embodiment of the current invention. As shown in FIG. 3, a system 300 may be carried out via central processing units (CPUs), such computing being performed on a single CPU, split up over several CPUs (e.g. networked) or performed remotely via the Internet. It is within the scope of the current invention to incorporate any known manner of interfacing information such as browser-type technology and windows-based formatting. "Pop up" windows, referred to herein, includes any known form of windows, separate from a main window. The following embodiment illustrates a subscription-type software service in which a primary user 301 and an end user 304 are distinct entities.

The primary user 301 may access interface A 306 and access a remote server 308 via electronic network, internet, intranet or the like. Through the remote server, a patent publication database 310 may be accessed. The database may comprise electronic publications of the USPTO, European Patent Office, Japanese Patent Office or the like or any combination thereof. Additionally, the patent publication database may comprise any electronic collection of patent publications on magnetic disc, CD-ROM or the like or any combination thereof. Interface A 306 may comprise a CPU, display module, user interfaces such as a keyboard and mouse, and a server. Through interface A, the primary user may access an annotation/publication database 312 for saving and storing data of the annotation record. The annotation/publication database may be accessible remotely through electronic network, internet, intranet, CD-ROM, magnetic disc or the like for access by a remote user, namely an end user or client.

The data of the annotation/publication database may be accessed by the end user 304 through interface B 316. Interface B 316 may also have remote access to the patent publication database 310 via the remote server 308. Both the search criterion 318 and the final search results 320, developed by the end user 304, may be stored or saved in a search storage database 322.

A. The Annotation Process

Figure 4:
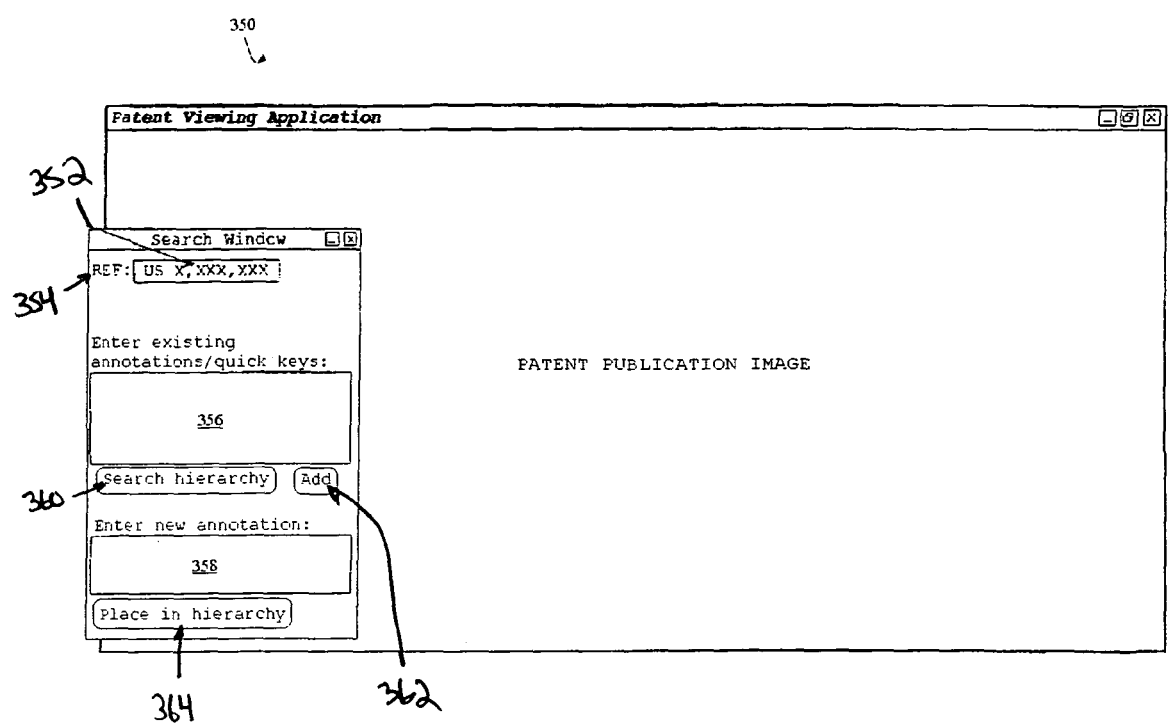
FIG. 4 is a screen view illustrating an embodiment of the current invention.
Figure 5:
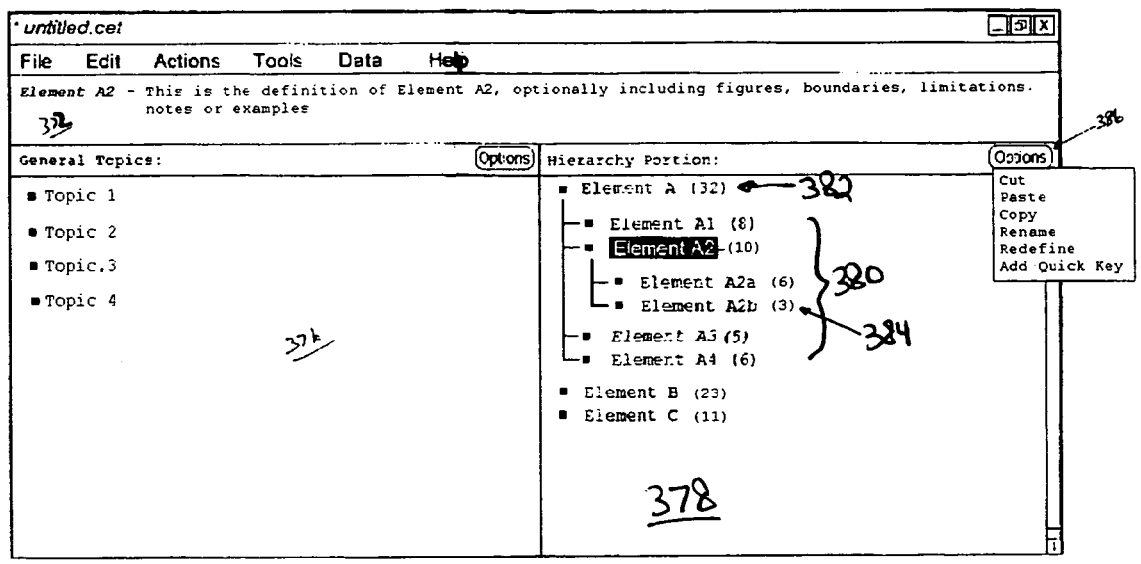
FIG. 5 is a screen view illustrating an embodiment of the current invention.

As shown in FIGS. 4-5, a first display module 350 of interface A 306 may comprise a publication-viewing application, e.g. an application for displaying .pdf, .tiff, .rtf or the like. Additionally, a pop-up window 352 may be applied for the primary user 301 to input annotations. The pop-up window 352 may comprise a reference identification box 354, automatically displaying the currently-viewed publication identification, and a first annotation input box 356 for manual input of annotations previously existent. A second annotation input box 358 may be applied for manual input of new annotations.

The first annotation input box may comprise a "Search Hierarchy" button 360, in which a primary user 301 may enter a query comprising a letter, portion of an annotation or annotation and be automatically directed to a graphical hierarchy representation 370 (as in FIG. 5) of the portion of the hierarchy containing the inputted query. From the graphical hierarchy representation 370, annotations may be selected and added to the set of annotations correlated with the viewed publication. An annotation may also be typed in and added through the first annotation input box 356 alone using an "Add" button 362.

The second annotation box 358 may be implemented for manual input of a new annotation. The primary user 301 may click on a "Place in hierarchy" button 364 for automatically linking to the graphical hierarchy representation. The primary user may than select a genus annotation of which the new annotation may belong. Topics may preferably be implemented to break down the entire hierarchy into several broad classifications. Thus, if an annotation is broader than any existing genus, the annotation may be placed within a topic. The primary user may then be prompted to input an annotation definition. An annotation definition may optionally be inputted.

As in FIG. 5, the graphical hierarchy representation (GHR) 370 may comprise three windows or frames within a window. The first GHR window 372 may automatically display the annotation definition corresponding to a selected annotation 374. The second GHR window 376 may display a macro view of general topics or broad annotations. The contents of the macro view may depend on at least the broadness, depth, or stage of development of the hierarchy. The third GHR window 378 comprises a detailed hierarchy portion of the general topic selected by the primary user 301. Species annotations 380 may be embedded within respective genus annotations 382. Species annotations 380 of a specific genus may be arranged in order of the number of publications 384 that each species annotation 380 yields. Alternatively (or in addition), annotations may be listed in alphanumeric order.

The primary user 301 may select annotations from the third GHR window 378. An "Options" button 386 may be implemented for supplying a set of commands, each to operate on a selected annotation. For example, an annotation may be "cut" from one location in the hierarchy and optionally "pasted" in another. A "cut and paste" operation serves to reclassify each individual publication represented by the annotation to be "cut" and "pasted." Similarly, a selected annotation may be "copied" and placed within another genus or "dragged and dropped." An annotation may be "renamed." An annotation may be redefined. An annotation may be given a "quick key." A "quick key" refers to a combination of keys that will automatically apply an annotation to a reference. "Quick keys" may be most effective for annotations that are applied often in annotation development. An example may be applying "CTRL+A" (CTRL referring to the Control key of a standard QWERTY keyboard) for the annotation of "comprising an acidic substance."

B. Conducting an Infringement Search

1. Compiling an Initial Set

Figure 6:
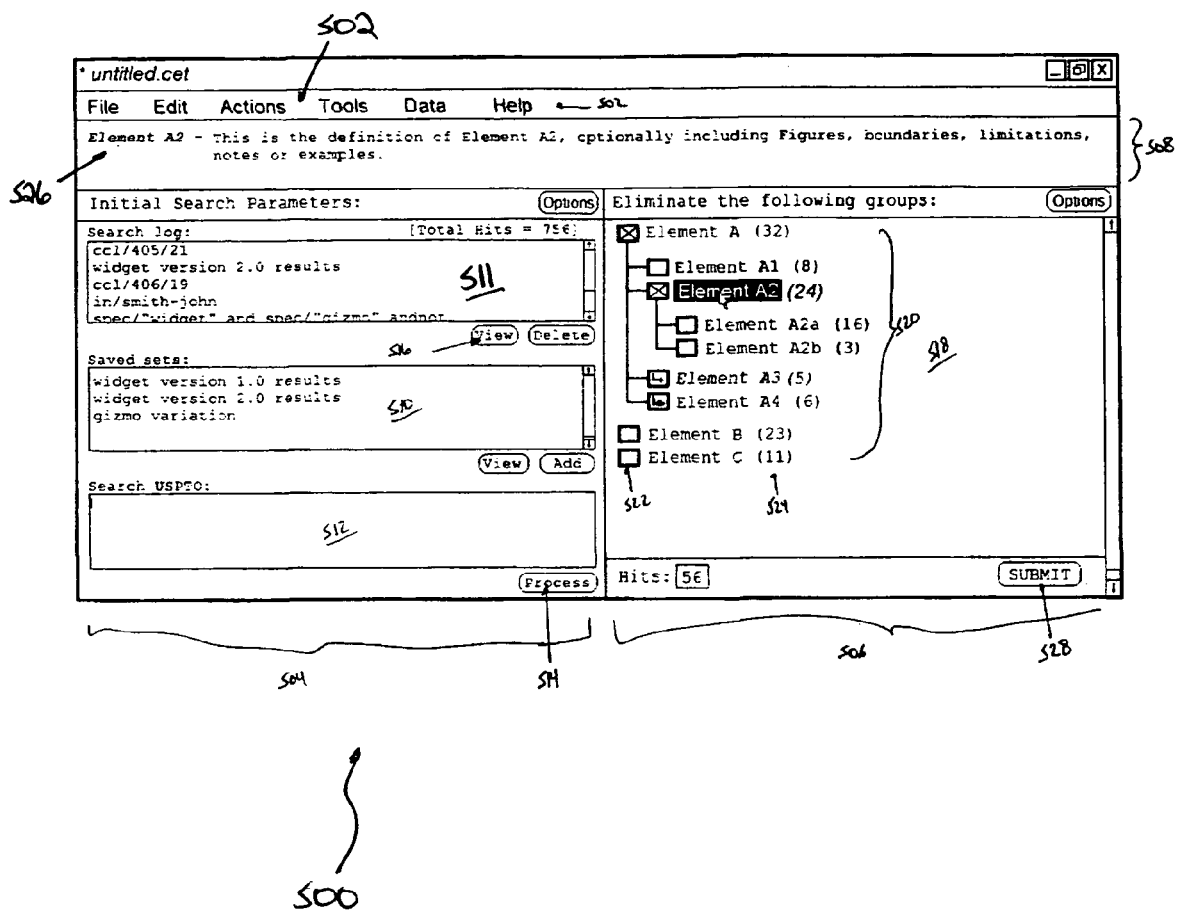
FIG. 6 is a screen view illustrating an embodiment of the current invention.

FIG. 6 illustrates an electronic display 500 in accordance with Interface B 316. The end user 304 may access Interface B 316. Interface B may comprise a CPU, server and a display 500. The display 500 may comprise a menu bar 502, first window 504, second window 506 and third window 508. The first window 504 may include an organization of initial search parameters. The end user 304 may use the first window 504 for compiling an initial set 303 of publications. Specifically, the first window 504 may include a first sub-window 510 for accessing saved sets of publications, labeled "Saved Sets." The end user 304 may access final search results of prior searches or a set of publications acquired by other known means as discussed herein. The end user 301 may input multiple sets.

The first window 504 may further comprise a second sub-window 512. The second sub-window 512 may provide a means for accessing a known electronic publication database, such as the USPTO, European Patent Office, Japanese Patent Office or the like or any combination thereof. The end user 304 may process and add known publication database queries to the initial set 303. Optionally, the known publication database query may be processed by clicking a "Process" button 514.

Figure 6A:
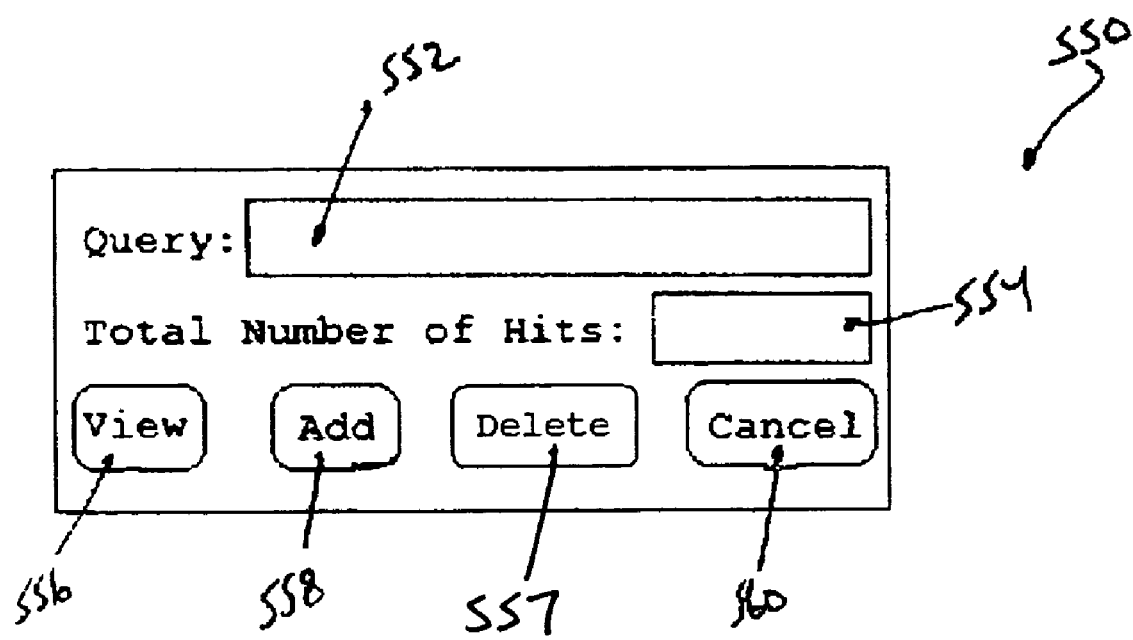
FIG. 6(a) is a screen view illustrating an embodiment of the current invention.
Figure 6B:
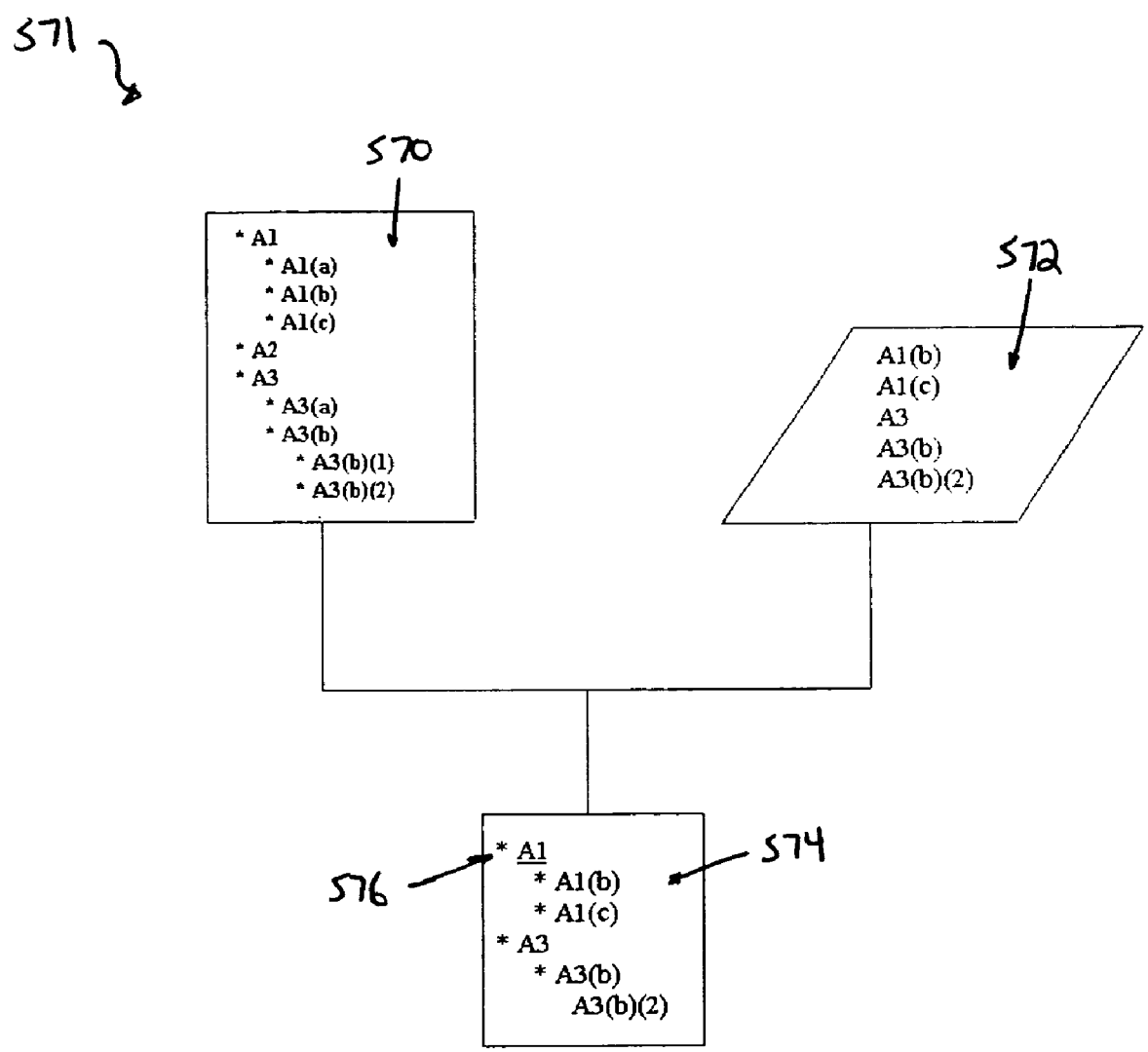
FIG. 6(b) is a block diagram illustrating an embodiment of the current embodiment

Clicking the "Process" button 514 may call a first pop-up window as in FIG. 6(a). The first pop-up window 550 may display the query 552 and data information pertaining to the query, such as "Total Number of Hits" 554. The first pop-up window 550 may also provide a button 556 for the end user 304 to view results, resulting in the appearance of a second pop-up window (not shown) displaying resulting hits of the query and optionally data information such as "Filing Date," "Title," "Inventor," "Assignee" and the like. The end user 304 may delete individual publications from the query, add all results 558 to the initial set 303 or cancel the query 560 by clicking on respective buttons as shown.

As in FIG. 6, the third sub-window 511 may display a log, labeled "Search Log," listing all queries and sets of publications inputted by the end user 304. The end user 304 may view compiled publications of a query by optionally clicking on a "View" button 516. Clicking on the "View" button 516 may result in the appearance of a third "pop-up" window (not shown) listing compiled resulting publications. As in the second pop-up window 550, resulting hits may be displayed in the third pop-up window along with publication data information. The end user 304 may delete individual publications from the compilation. The end user 304 may also delete entire queries or sets of publications from the third sub-window 511. The initial set 303 may be saved for later reference.

2. The Custom Hierarchy

As in FIG. 6, the second window 518 relates to the annotation record. Displayed may be a portion 520 of the annotation record arranged in hierarchy form. In some embodiments, an automated function may be employed to eliminate from display annotations within the annotation record that do not correlate to publications of the specific initial set inputted by the end user 304. Such a function may operate by first reading in the initial set 303 of publications as compiled by the end user 304, and relating the initial set 303 to the annotation/publication database. Annotations, and placeholders in some embodiments, that relate to publications of the initial set are extracted from the annotation record in creating a custom hierarchy. If a genus annotation does not relate to a publication of the initial set, but a species of the genus does relate, the genus annotation is listed, but serves as a placeholder. Thus, annotations that do not relate to publications of the initial set 303 are automatically eliminated in forming the custom hierarchy. It is preferred that the annotations comprise the same relative structure in the custom hierarchy as in the hierarchy of the annotation record. The end result is a custom hierarchy comprising only annotations that are relevant to publications of the initial set. As such, the end user or client is assured that time will not be wasted considering annotations that bear no effect on reducing the amount of publications of the initial set.

FIG. 6(*b*) illustrates an example of the creation of a custom hierarchy. A portion of the hierarchy of the annotation record 570 is shown. An automated function compares annotations of publications of an initial set 572 with the hierarchy of the annotation record 570. The result is a custom hierarchy 574 including annotations of publications of an initial set 572. The relative structure of annotations is maintained. Further, annotation "A1" 576 becomes a placeholder annotation.

3. Creating the Search Criterion

The custom hierarchy may be displayed in the second window 518 and may be listed in tree form, each species embedded within the related genus. Each annotation listing may comprise a check box 522, hyperlink or tag. Each annotation may be followed by a numerical indicator 524 displaying the total number of hits retrieved per annotation. It is preferred that the selecting of a genus annotation automatically results in selecting each species annotation embedded within. The end user 301 may alternatively opt to expand the genus annotation, revealing the next generation of species embedded within it. The end user 301 may then select species annotations individually. Selecting the text of the annotation may result in the definition 526 of the annotation being displayed. Definitions may be displayed in the third window 508. An annotation definition 526 may include figures, boundaries, limitations, notes, examples or the like or any combination thereof, used to further define and explain the related annotation.

a. Discretionary Nature of the Search Criterion

The end user 301 may select annotations on a discretionary basis. For example, if the end user 301 is either unsure of whether a specific element is present in conjunction with a reference entity 302 or unsure of the limits of the annotation, the end user 301 may opt not to select the annotation. Since selection of annotations relates to elimination of annotations, an end user 301 not selecting an annotation results in the retrieval of the publications correlated to the unchecked annotations (unless the publications are otherwise eliminated).

Figure 7:
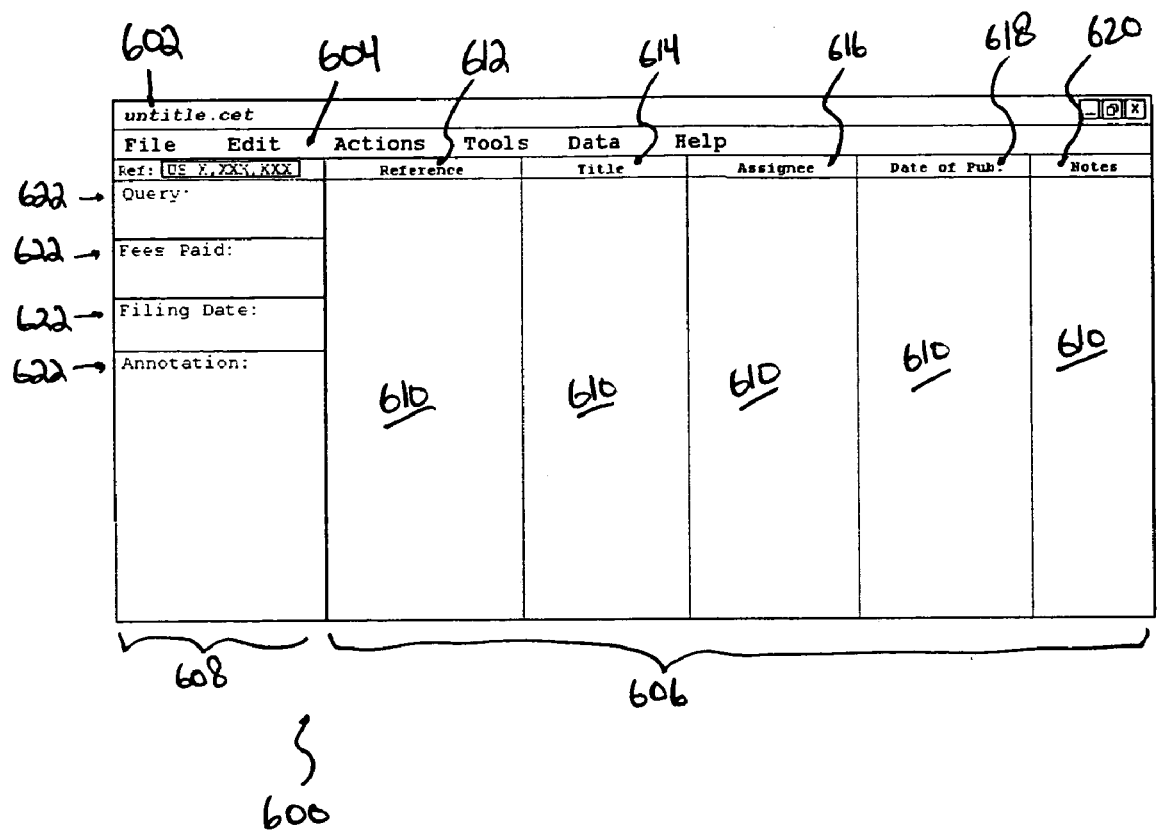
FIG. 7 is a screen viewo illustrating an embodiment of the current invention.

At the completion of the annotation selection, the end user may click on a "Submit" button 528. The final search results 320 may then be displayed in a third display window 600 as shown in FIG. 7. The third display window 600 may comprise an application identification bar 602, a menu bar 604, a right window 606 and a left window 608. The right window 606 may comprise a plurality of columns 610, each column 610 pertaining to a specific field. The fields may relate to publication data information such as reference number 612, title 614, assignee 616, dates of publication 618 and notes 620. The end user 301 may click on an individual publication of the final search results and be able to view the images associated with the publication through an application capable of reading the format of the publication.

The left window 608 may comprise a second set of fields 622. The second set of fields may pertain to publication-specific fields relating to the publication that the end user clicks on in the right window 606. The second set of fields 622 may include reference number, query, fee payment status, filing date and a list of applied annotations.

An option (not shown) may be provided allowing an end user 301 to view the specific set of publications that correlate to specific annotations of the custom hierarchy. Viewing sets of publications of annotations may be advantageous in novelty-type searches or patentability-type searches.

If a publication of the initial set relates to more than one annotation in the custom hierarchy, the end user may eliminate the publication by selecting of any of several annotations of the custom hierarchy. Thus, the process of creating a search criterion may be quickened by an automated function for updating or refreshing the custom hierarchy at specific intervals. The automated refreshing process may eliminate annotations of the custom hierarchy that correspond to publications relating to annotations previously selected by the end user. In some embodiments, the search criterion may be refreshed on the end user's command. In other embodiments, the search criterion may be refreshed at periodic intervals or upon each annotation selection by the end user.

b. Accounting for Subsequent Design Variations of a Reference Entity

The search criterion may be saved and retrievable for future searches. For example, consider the case of conducting a clearance search for a reference entity where it is conceivable that there may be a variation of one or more of the characteristics of the reference entity within the object's developmental life cycle. A first search may be conducted for a first version of the reference entity. The first search criterion may then be saved. A second search may then be conducted with respect to a second version of the reference entity, which may be a variation of the first version of the reference entity. For the second search, the end user 301 may input the same initial set as in the first search or input a new-initial set. The end-user 301 may then retrieve the search criterion of the first search and indicate that a variation is to take place. Such an indication may visually result in a change to the font or appearance of the selected annotations of the first search criterion and allow the end user 301 to override the selections of the first search criterion in accordance with the variation or variations in characteristics of the reference entity. It is preferred that modifications of the search criterion are visually distinguishable from the original annotation selections. The end user 301 may then "submit" the modified criterion. The result, in final search results, is a compilation of publications that are relevant solely due to the variation of the reference entity vis-à-vis the original reference entity.

III. Additional embodiments

A. Global Structure

Figure 8:
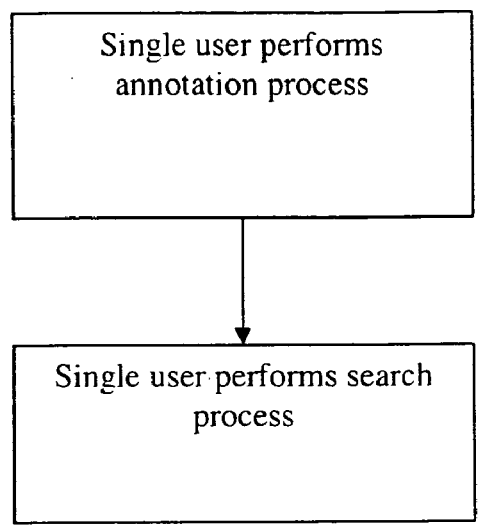
FIG. 8 is a schematic diagram illustrating an embodiment of the current invention.

As illustrated in FIG. 8, in an alternative embodiment, both the annotation process and the search process, as described herein, takes place at a single location 702 by a single user. The single user may be an individual, corporate entity, law firm, search firm or the like. In such an embodiment, the annotation process may be continuous and occur simultaneously with the search process. Annotations are continuously added, deleted, applied to publications or modified to further the efficiency and speed of the overall system. In this case, annotations may be specifically defined in accordance with the user's specific understanding. Further, in this case, annotations may be specifically directed to technical areas of concern to the user.

Figure 8A:
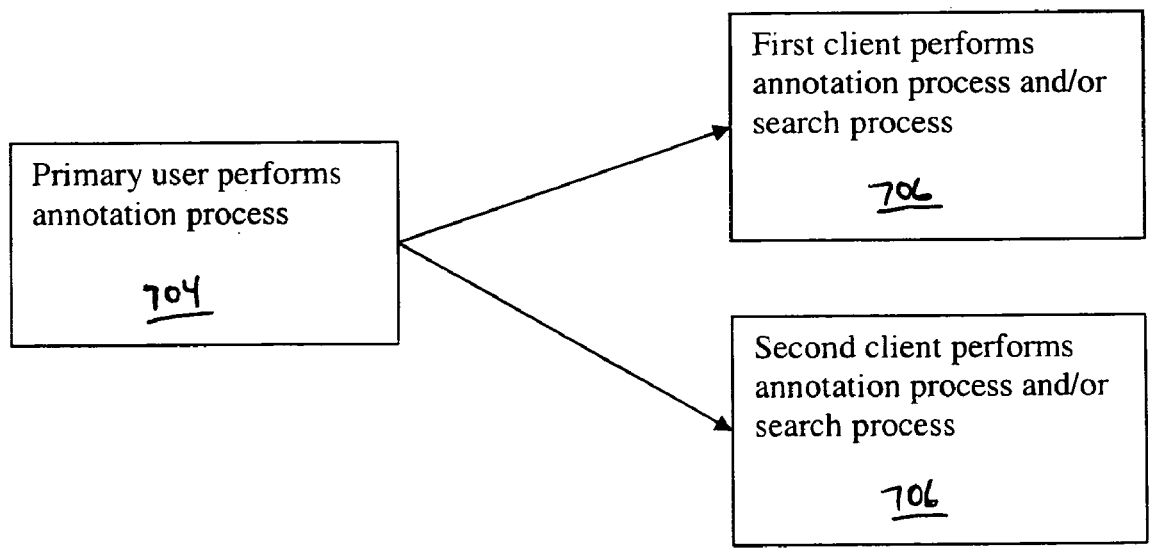
FIG. 8(a) is a schematic diagram illustrating an embodiment of the current invention.

As illustrated in FIG. 8(a), in another embodiment, the annotation process, as described herein, is shared between a primary user 704 and at least one client 706, preferably through means of a subscription service. The primary user 704 may develop an annotation/publication database directed toward a broad technical field, while providing computer-implemented tools for the client to modify and further develop the annotation/publication database in accordance with the client's specific technical field. An advantage of this embodiment may be in overcoming diminishing returns associated with annotating a broad technical field. While benefits generally exist in developing annotations directed toward a broad technical field, a critical point in the annotation process may exist where further development may be ineffective as compared to further development directed toward a specific technical field.

Figure 8B:
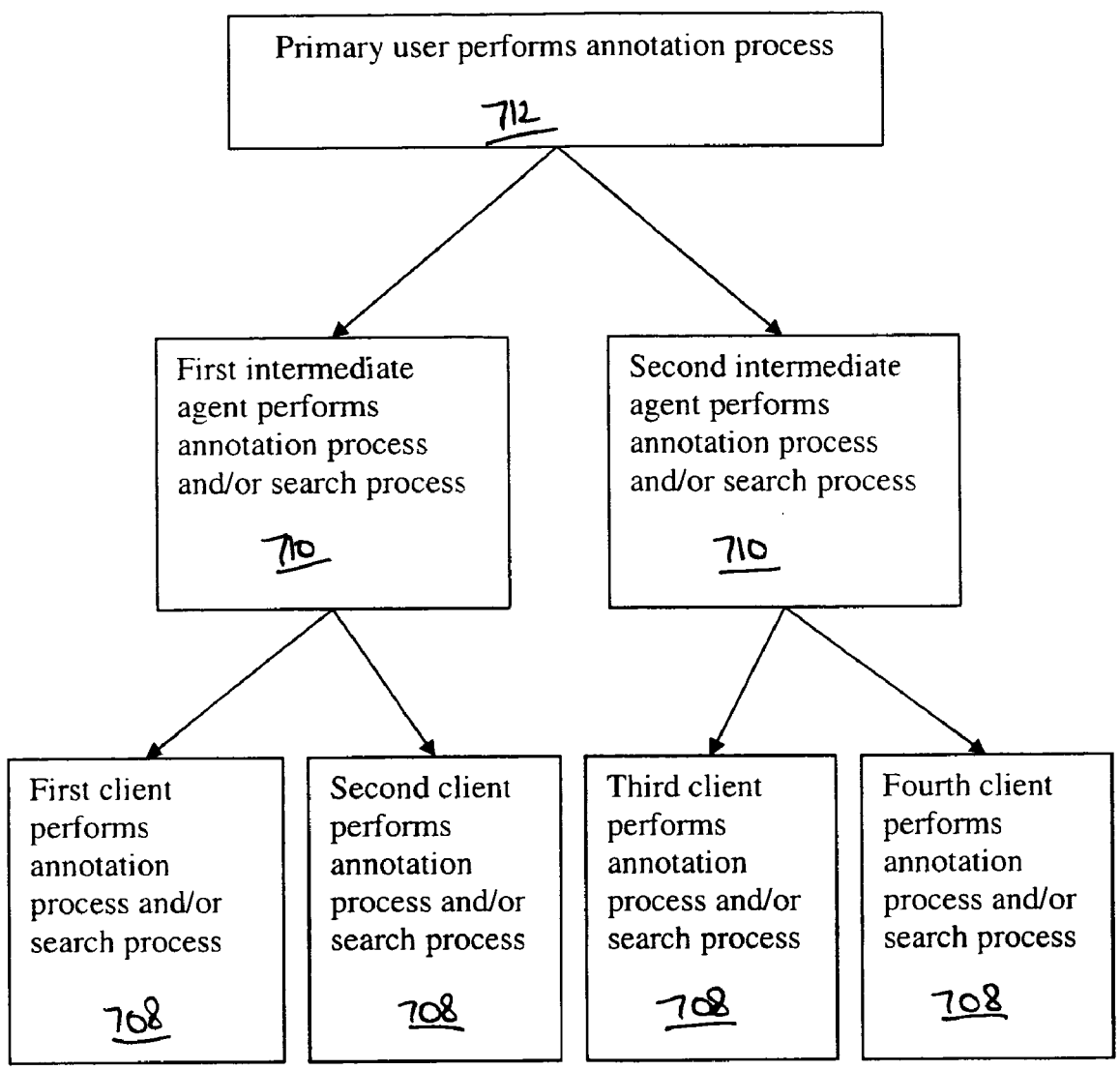
FIG. 8(b) is a schematic diagram illustrating an embodiment of the current invention.
Figure 9:
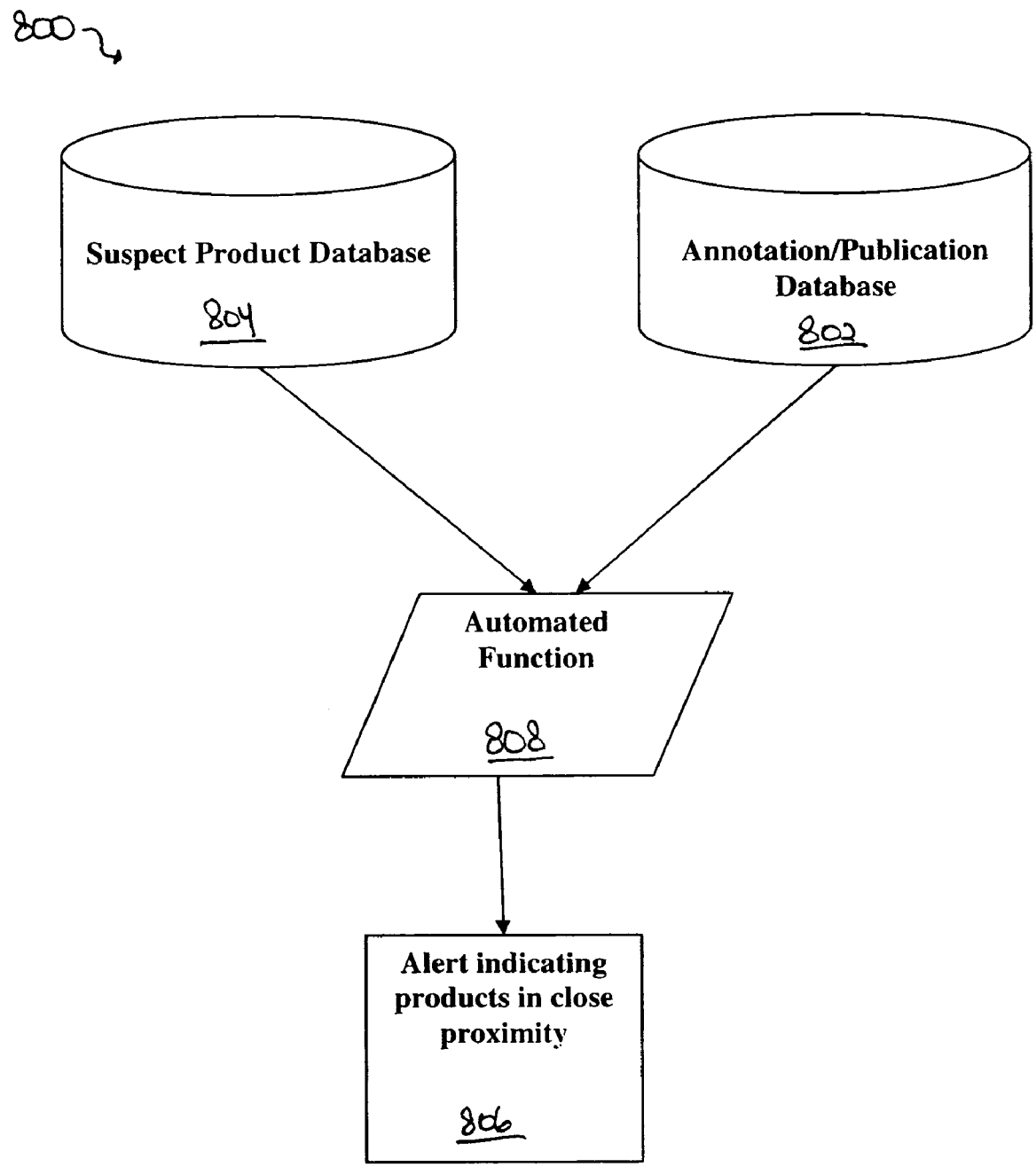
FIG. 9 is a schematic diagram of an embodiment of the current invention.

As illustrated in FIG. 8(b), in yet another embodiment, at least one of either the annotation process or the searching process is shared between at least one client 708 and at least one intermediate agent 710. In such a case, the primary user 712 may develop an annotation database directed toward a broad technical field. The agent 710 may further develop the annotation database directed toward a narrower technical field. Finally, the client 708 may develop the database directed towards the client's specific technical field. The agent 710 may also conduct infringement searches on behalf of the client 708. Other structural configurations sharing processes of any of the embodiments of the current invention amongst discrete parties may be realized without departing from the scope and spirit of the current invention.

In yet a further embodiment of the current invention, the annotation/publication database is developed to include patent publications from multiple jurisdictions. While the standard of analysis may differ for various jurisdiction (e.g. EPO, JPO), it is preferred that the annotation record is universal. Where the current invention is to be implemented for a client of another language, it is preferred that only the annotations be translated. Thus, a client of another language, conducting an infringement search, may eliminate a substantial portion of publications without undue translation of each individual publication. Alternatively, a multi-language system may comprise independent annotation/publication databases, the annotations of each translated in multiple languages.

B. Specific Intellectual Property Portfolio Management

In yet a further embodiment of the present invention, an annotation/publication database 802, as described herein, may form the basis of a management system 800 for a client's own portfolio of IP publications. Assuming the annotation/publication database 802 to be sufficiently developed with regards to the technical field of the client, a second database, a suspect product database 804, may be created where suspect products are annotated according to the same annotation record as the annotation/publication database 802. The client may designate a first set of publications of interest. An automated function may then continuously, periodically, or at command of the client, compare annotations of products of the second database with annotations of the first set and alert the client 806 if a product falls within the scope of annotations of a patent publication of the first set. Additional algorithms 808 may be applied to filter either products or patent publications that are either scantily-annotated or otherwise likely to create false alerts. Such a system may be beneficial for a client who operates within a complex technical art or has a large IP portfolio.

While specific embodiments have been described above, it will be appreciated that the invention may be practiced otherwise than as described. The descriptions above are intended to be illustrative and not limiting. Thus it will be apparent to one skilled in the art that modifications may be made to the invention as described without departing from the scope of the claims set out below.

I claim:

1. A method of extracting publications relevant to a reference entity in question, comprising the steps of:
generating a database by associating a plurality of patent publications with a plurality of annotations;
receiving an initial set of patent publications;
associating the initial set of patent publications with the database;
displaying a user-engageable arrangement of annotations from the database including a first annotation, a second annotation and a third annotation, wherein the first annotation represents a first required characteristic of a first patent publication, the first required characteristic evaluated to be required for the first patent publication to be infringed by any reference entity based on a first claims portion of the first patent publication and in accordance with a predetermined standard of analysis, and the second and third annotations represent in conjunction, but not individually, a second required characteristic of a second patent publication, the second required characteristic evaluated to be required for the second publication to be infringed by any reference entity based on the language of a second claims portion of the second publication and in accordance with the predetermined standard of analysis;
receiving a user selection of a set of annotations, from the displayed arrangement of annotations, that correspond to characteristics not present in the reference entity in question; and
yielding a result including publications from the initial set relating to non-selected annotations from the arrangement of annotations and excluding publications from the initial set relating to the selected set of annotation, based on the user selection, the result including the second publication if the user selects either the second or third annotation but not both the second and third annotation, and excluding the second publication if the user selects both the second and third annotation.

2. The method of claim 1, wherein the resulting publications comprise at least one publication that does not correlate to an annotation in the database.

3. The method of claim 1, further comprising receiving a plurality of selections of annotations, and storing the selections in a record.

4. The method of claim 3, wherein the reference entity in question is a first reference entity, the method further comprising modifying the selections of the record based on variations between the first reference entity and a second reference entity.

5. The method of claim 1, further comprising:

receiving selections of annotations for a plurality of distinct reference entities;

yielding a result of publications for each distinct reference entity based on the selections associated with each reference entity;

correlating the resulting publications with each reference entity, respectively; and upon an identification of a particular publication, displaying each reference entity with which the particular publication is correlated.

6. The method of claim 1, wherein the step of displaying a user-engageable display of annotations further comprises displaying a genus annotation and a species annotation such that the species annotation is hierarchically embedded within the genus annotation.

7. The method of claim 1, further comprising the step of removing, from the displayed arrangement of annotations, unselected annotations that exclusively relate to publications represented by annotations that have been selected.

* * * * *